L. F. BOWERS.
DRIVING MECHANISM.
APPLICATION FILED MAY 16, 1912.
1,093,248.
Patented Apr. 14, 1914.
2 SHEETS—SHEET 1.
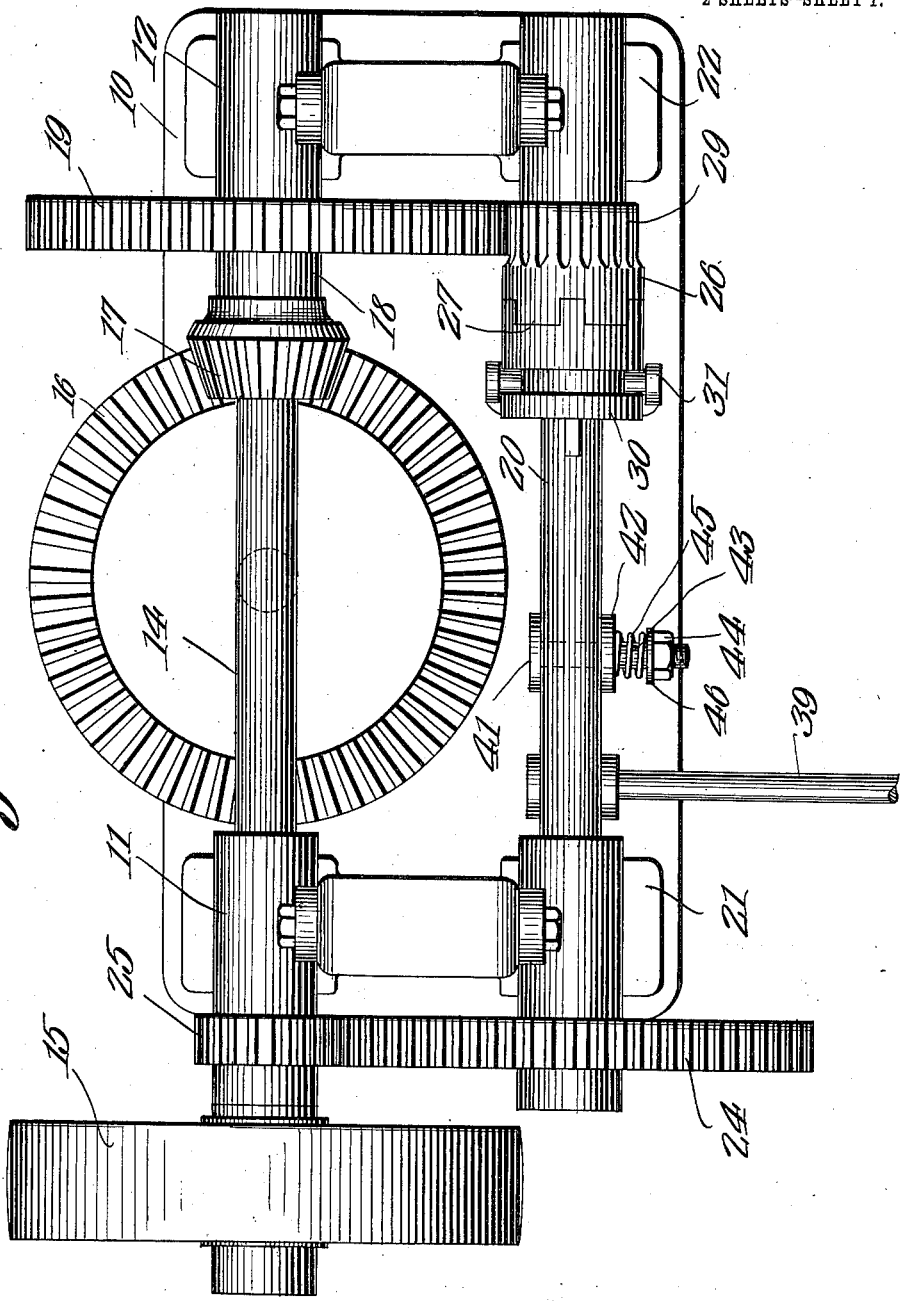
Witnesses
Lionel F. Bowers
Inventor,
by C. A. Snow & Co.
Attorneys.

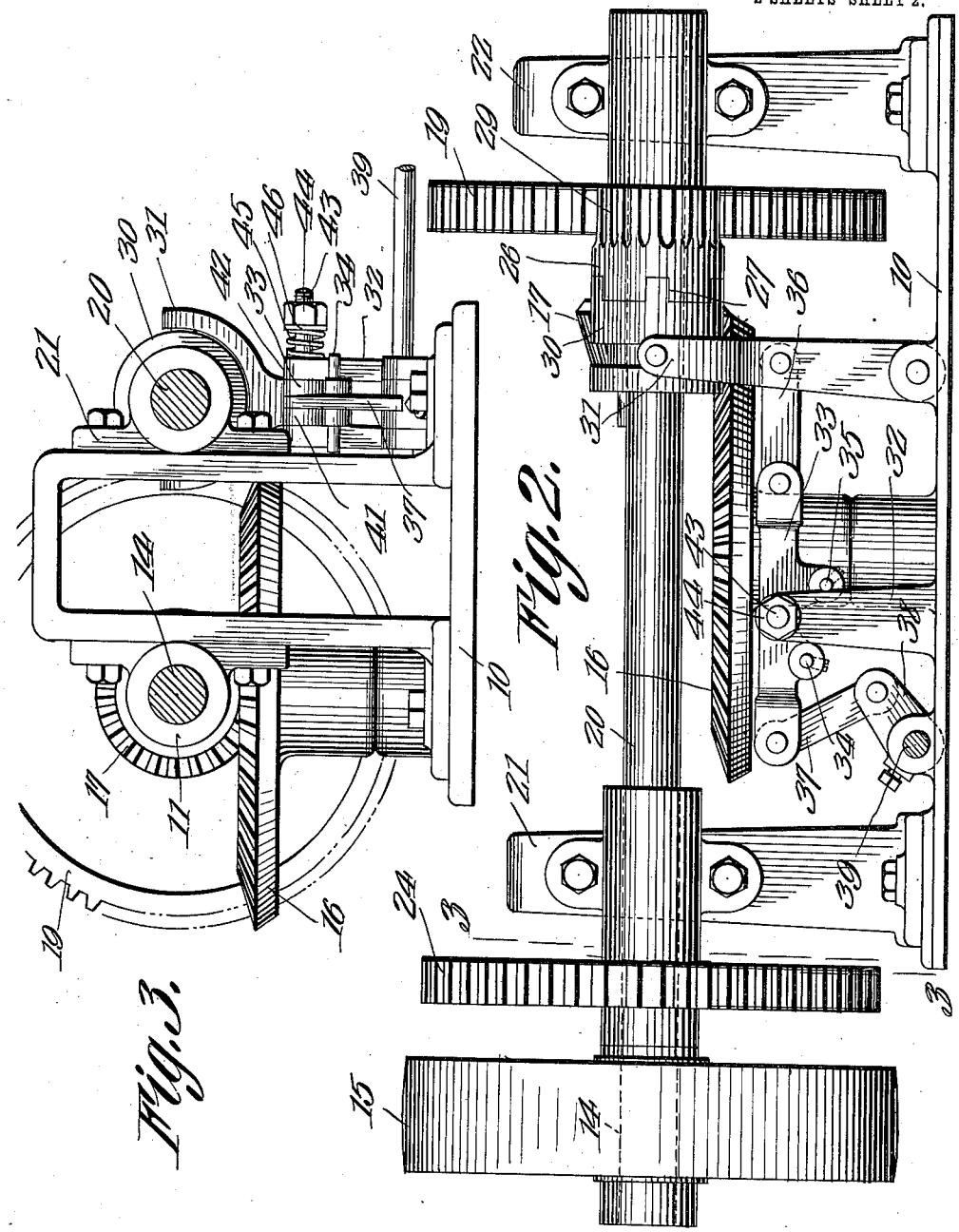

UNITED STATES PATENT OFFICE.

LIONEL F. BOWERS, OF COLUMBIA, PENNSYLVANIA, ASSIGNOR TO COLUMBIA MANUFACTURING COMPANY, OF COLUMBIA, PENNSYLVANIA.

DRIVING MECHANISM.

1,093,248.  Specification of Letters Patent.  Patented Apr. 14, 1914.

Application filed May 16, 1912. Serial No. 697,751.

*To all whom it may concern:*

Be it known that I, LIONEL F. BOWERS, a citizen of the United States, residing at Columbia, in the county of Lancaster and State of Pennsylvania, have invented a new and useful Driving Mechanism, of which the following is a specification.

This invention relates to an improved driving mechanism.

The primary object of the present invention is to provide a driving mechanism in which the driving means are loosely mounted on the driven shaft, means being provided on a lay shaft adjacent said driven shaft for driving said loosely mounted means which in turn drives the mechanism to which it is desired to transmit power.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a top plan view. Fig. 2 is a front elevation. Fig. 3 is a section taken on the line 3—3 of Fig. 2.

In the drawings, 10 designates the support. The bearings 11 and 12 are arranged on said support, said bearings supporting the driven shaft 14. This shaft 14 extends beyond the bearing 11 and arranged upon the portion of said shaft which extends beyond said bearing is a pulley 15, power being transmitted to the shaft by a belt which passes over said pulley.

The mechanism is specifically designed for use in a laundry drying room, the bevel gear 16 driving the conveyer mechanism. The large gear 16 is driven by the pinion 17 which is provided with a sleeve 18 on which the gear 19 is mounted, the sleeve 18 on which the gear 19 and the pinion 17 are mounted, being loosely mounted upon the shaft 14, the pinion 17 being disposed to mesh with the gear 16. The lay shaft 20 is supported adjacent the driven shaft 14 by brackets 21 and 22, a gear 24 arranged on said shaft meshing with a gear 25 arranged on the shaft 14. A clutch member 26 is loosely mounted on the shaft 20, the extension 27 of said clutch member being provided with a gear 29 which meshes with the gear 19. A clutch member 30 arranged to engage with the clutch member 26, said members being formed with the interlocking projections 27, is splined on the shaft 20 being moved on said shaft by the bifurcated lever 31. Arranged adjacent the lever is a bracket 32 which supports the rocking arm 33 which is limited in its movement in either direction by stops 34 and 35. This rocker arm is connected by means of a link 36 with the lever 31. The arm 33 is actuated by the link 37 which is connected to the arm 38 carried by the shaft 39. It will be noted that as the shaft 39 is rotated, the rocker arm 33 will impart movement to the bifurcated lever 31, the movement of said shaft in one direction throwing the clutch members in contact, the movement of the shaft in the other direction, bringing said members out of contact. It will be noted that while the members are in contact, that the clutch member 26 will be locked to the shaft 20, and movement will be imparted to the gear 19. It will be noted that as this gear is rotated, a pinion which is fixed to the same will transmit movement to the gear 16 and through said gear to the conveyer mechanism of the drying room, the shaft 39 extending to a point toward the front of the drying room where the same may be conveniently manipulated by the operator. The bracket 32 which supports the rocking lever 33 is formed with arms 41 and 42, a bolt 43 passing through said arms and through the lever 33. Thus in order to provide a resilient means between the arm 42 and the end of the bolt 43, a spring 45 is placed upon the bolt adjacent the arm 42 and is abutted by a washer 46, a nut 44 being placed upon the end of the bolt to adjust the washer to regulate the tension of the spring 45. With this construction, the arm through its own weight will not move in either direction, it being necessary to rock the shaft 39 in order to move said arm to either lock or release the clutch.

The many advantages of a driving mechanism of this character will be clearly apparent as it will be noted that the same may be easily and economically manufactured and that the rotation of a driven element may be controlled in a simple and convenient manner.

What is claimed is:—

1. A driving mechanism including a driving shaft, a pinion loosely mounted on said shaft, a gear fixed to said pinion, a counter shaft, meshing gears carried by said first mentioned shaft and said counter shaft, a clutch member loosely mounted on the counter shaft, a gear fixed to said clutch member and arranged to mesh with the gear which is fixed to the pinion mounted on the first shaft and a clutch member splined on the counter shaft for locking the first mentioned clutch member to the shaft.

2. In a driving mechanism, a support, a driving shaft, a gear loosely mounted upon said shaft, a gear fixed to said shaft, a counter shaft driven by said gear, a sleeve loosely mounted upon said counter shaft, a gear mounted upon said sleeve, said sleeve being formed with a clutch face, a clutch member splined upon said shaft, a pivoted bifurcated member having an operative connection with said member, a lever having a link connection with said members and a rock shaft for imparting movement to said lever to actuate said clutch.

In testimony that I claim the foregoing as my own, I have hereto affixed my signature in the presence of two witnesses.

LIONEL F. BOWERS.

Witnesses:
FRANK H. WEIGEL,
EDWARD M. BARTEL.

---

Copies of this patent may be obtained for five cents each, by addressing the "Commissioner of Patents, Washington, D. C."